(12) United States Patent
Colarow

(10) Patent No.: US 8,197,877 B2
(45) Date of Patent: Jun. 12, 2012

(54) MODIFIED COCOA PRODUCT AND PROCESS FOR ITS MANUFACTURE

(75) Inventor: Ladislas N. A. Colarow, Savigny (CH)

(73) Assignee: Nestec S.A., Vevey (CH)

( * ) Notice: Subject to any disclaimer, the term of this patent is extended or adjusted under 35 U.S.C. 154(b) by 1174 days.

(21) Appl. No.: 11/577,937

(22) PCT Filed: Jun. 29, 2005

(86) PCT No.: PCT/EP2005/006979
§ 371 (c)(1),
(2), (4) Date: Apr. 25, 2007

(87) PCT Pub. No.: WO2006/045354
PCT Pub. Date: May 4, 2006

(65) Prior Publication Data
US 2009/0226562 A1    Sep. 10, 2009

(30) Foreign Application Priority Data

Oct. 25, 2004    (EP) ..................................... 04025278

(51) Int. Cl.
*A23G 1/00*    (2006.01)

(52) U.S. Cl. ........................... 426/593; 426/631; 426/45

(58) Field of Classification Search .................. 426/593, 426/631, 45
See application file for complete search history.

(56) References Cited

U.S. PATENT DOCUMENTS

| 3,459,557 A | 8/1969 | Ohashi et al. |
| 4,608,267 A | 8/1986 | Dutilh et al. |
| 4,849,132 A * | 7/1989 | Fujita et al. ...................... 516/56 |
| 5,753,296 A | 5/1998 | Girsh et al. |
| 5,800,850 A * | 9/1998 | Clyde et al. ...................... 426/45 |
| 2004/0071858 A1 | 4/2004 | Nijhuis et al. |

FOREIGN PATENT DOCUMENTS

| DE | 37 16 227 | 12/1988 |
| EP | 0 379 023 | 7/1990 |
| EP | 0455 386 | 11/1991 |

OTHER PUBLICATIONS

Parsons, J. et al. 1969. Journal of Food Science 34:497.*
Parsons, J. G. et al. 1969. JAOCS 46:425.*
Minifie, Bernard. 1980. Chocolate, Cocoa and Confectionery: Science and Technology, 2nd edition. AVI Publishing Company, Inc. Westport, CT. p. 102-103.*

* cited by examiner

*Primary Examiner* — Carolyn Paden
(74) *Attorney, Agent, or Firm* — K&L Gates LLP

(57) ABSTRACT

The invention relates to a modified cocoa product and process for its manufacture. In particular the invention relates to a cocoa product improving wettability in powdered beverages, having a reduced content of endogenous phospholipids.

26 Claims, 4 Drawing Sheets

MODIFIED COCOA PRODUCT AND PROCESS FOR ITS MANUFACTURE

FIELD OF INVENTION

This invention relates to a cocoa product improving wettability in powdered beverages. In particular, it relates to a modified cocoa product in which the content of phospholipids is highly reduced. The invention also relates to methods of producing such cocoa products.

BACKGROUND OF THE INVENTION

It is current practice to improve color and flavor attributes in cocoa matrices, i.e. nibs, liquor, or powder by increasing the natural pH value of about 5.5 by alkalizing. Typical cocoa liquor contains >50% fat, 12% protein residues, 9% cellulose, 6% polyhydroxyphenols, 7% starch (amylose; amylopectin 70:30; w/w), 4% pectins, 2% water, organic acids, and a range of minor constituents such as phospho- and glycolipids.

Cocoa alkalization practices mostly proceed on a knowhow basis. In principle, alkalization consists in mixing defined volumes of aqueous alkali with a cocoa product. Such a treatment modifies flavor and color attributes by increasing the natural pH value in cocoa. The addition of alkalizing solution provokes known (e.g. color and flavor) and unknown changes in the cocoa matrix. Different types of alkalized liquors are pressed to obtain a particular cocoa powder for target food products. In special cases, excess water is used to obtain a wet alkalized cocoa liquor variant. For unknown reasons, such a variant happens to produce excellent wettability effects on the reconstitution of powdered and agglomerated cocoa drinks in aqueous media. In this context, improved wettability is hypothesized to depend on several criteria: the extent of functional changes induced by wet alkalization in cocoa starch granules, the subsequent behavior of modified starch during agglomeration of different ingredients that constitute the powdered beverage and also, factor-dependent effects in the final matrix of agglomerated powder containing several interacting ingredients.

In general, starch granules exothermically absorb water at ambient temperature. This water uptake is reversible. A sufficient temperature increase triggers an endothermic process that leads to starch swelling, concomitant leaching of amylose, and irreversible gelatinization. In principle, the occurrence of the aforementioned process is possible in cocoa liquor due to the presence of about 7 wt-% of native starch.

In addition, it is well known that cocoa products contain endogenous phospholipids. For instance, Fincke-A and Knopp-M (1977) *Phosphatide content of cocoa products and raw materials of the chocolate industry*, Gordian 77:288-292 found that phospholipids averaged 3.7 g/kg, i.e. about 4.9 mmol/kg in fifteen different cocoa liquors (coefficient of variation 11%).

Published papers indicate that endogenous phospholipids impair starch swelling in general. Becker-A, Hill-S E, Mitchell-J R (2001), Relevance of amylose-lipid complexes to the behaviour of thermally processed starches, Starch/Stärke 53:121-130 showed that phospholipid-amylose-complexes form insoluble films on the surface of starch granules. Such films delay water transport into the granules and prevent starch swelling. In this context, anti-swelling effects are thought to occur in starch during wet alkalization of cocoa liquor in the presence of excess phospholipids. Non-swelling starch is thought to be an anti-wettability factor in instant cocoa beverages. In theory, such starch is unable to scavenge migrating fat in powdered cocoa matrix. In addition, minimized starch swelling and excess phospholipids could contribute to enhanced retrogradation, as reported by Singh-N, Singh-J, Kaur-L, Sodhi-N S, Gill-B S (2003) Morphological, thermal and Theological properties of starches from different botanical sources, Food Chem 81:219-231. Retrograded starch and its hydrophobicity are presumed to be additional anti-wettability factors.

For the purpose of this specification, the term "wettability" should be understood to mean the ability of the cocoa-based powder to dissolve in foodgrade liquids within a reasonable period of time. Wettability is the drowning period measured in seconds for an appropriate amount of powdered beverage that is added as a single dose into an aqueous medium such as milk of specified volume of defined freshness, temperature and composition.

The term "cocoa product", as used in this specification, means a product obtained from cocoa beans after roasting and grinding. Examples for such cocoa products are cocoa liquor and cocoa powder.

There are reasons to hypothesize that cocoa contains enough native (endogenous) phospholipids to interact with starch in situ, especially during factor-dependent effects of alkalization, agglomeration with other ingredients and storage of the final product. In theory, the molar concentration of phospholipids in cocoa is much higher compared to starch based on equi-ponderal amounts. Cocoa fermentation frees these phospholipids from their carrier lipoproteins for uncontrolled phospholipid-starch interactions. Free phospholipids and their amphipathic, i.e., hydro- and lipophilic nature are believed to enhance the penetration of ambient moisture into the cocoa matrix. Increased moisture is hypothesized to trigger uncontrolled anti-wettability effects during a recurrent exposure of instant cocoa beverages to ambient air and subsequent storage.

The anti-wettability effects are manifold involving native phospholipids and the starch matrix both present in the cocoa product. They are presumed to be related to insufficient cocoa starch swelling and insufficient amylose leaching and starch retrogradation. In addition, moisture penetration and starch retrogradation are likely to cause uncohesiveness in the matrix of agglomerated particles that combine cocoa with other food ingredients. Such destabilized agglomerates are prone to splitting into hydrophobic sub-units, especially during handling.

It is therefore an object of the invention to improve the cocoa product for obtaining defined and non-fluctuating wettability effects in powdered cocoa beverages.

It is another object of the invention to provide a cocoa product having defined functional properties in instant beverages exposed to destabilizing factors such as ambient moisture and prolonged storage.

SUMMARY OF THE INVENTION

The invention provides cocoa products, compositions containing said products, beverages containing the compositions and a process of producing a cocoa product.

According to a first aspect of the invention, a cocoa product is characterized by its reduced content of phospholipids such as endogenous phospholipids.

According to a second aspect of the invention, a composition is characterized by containing a cocoa product as defined above.

According to a third aspect of the invention, a beverage is characterized by containing the above composition.

According to a fourth aspect of the present invention, a process is provided for producing a cocoa product having improved wettability factors by decreasing the phospholipid content of the cocoa product.

According to a fifth aspect of the present invention a process of producing a cocoa liquor having an improved phospholipid content is provided comprising the steps of providing a cocoa liquor; subjecting the moisturized cocoa liquor to a deacylation treatment; alkalizing the cocoa liquor with an alkalization agent and drying the alkalized cocoa liquor.

The sub-claims define specific embodiments of the present invention.

DETAILED DESCRIPTION OF EMBODIMENTS

Figure 1A:
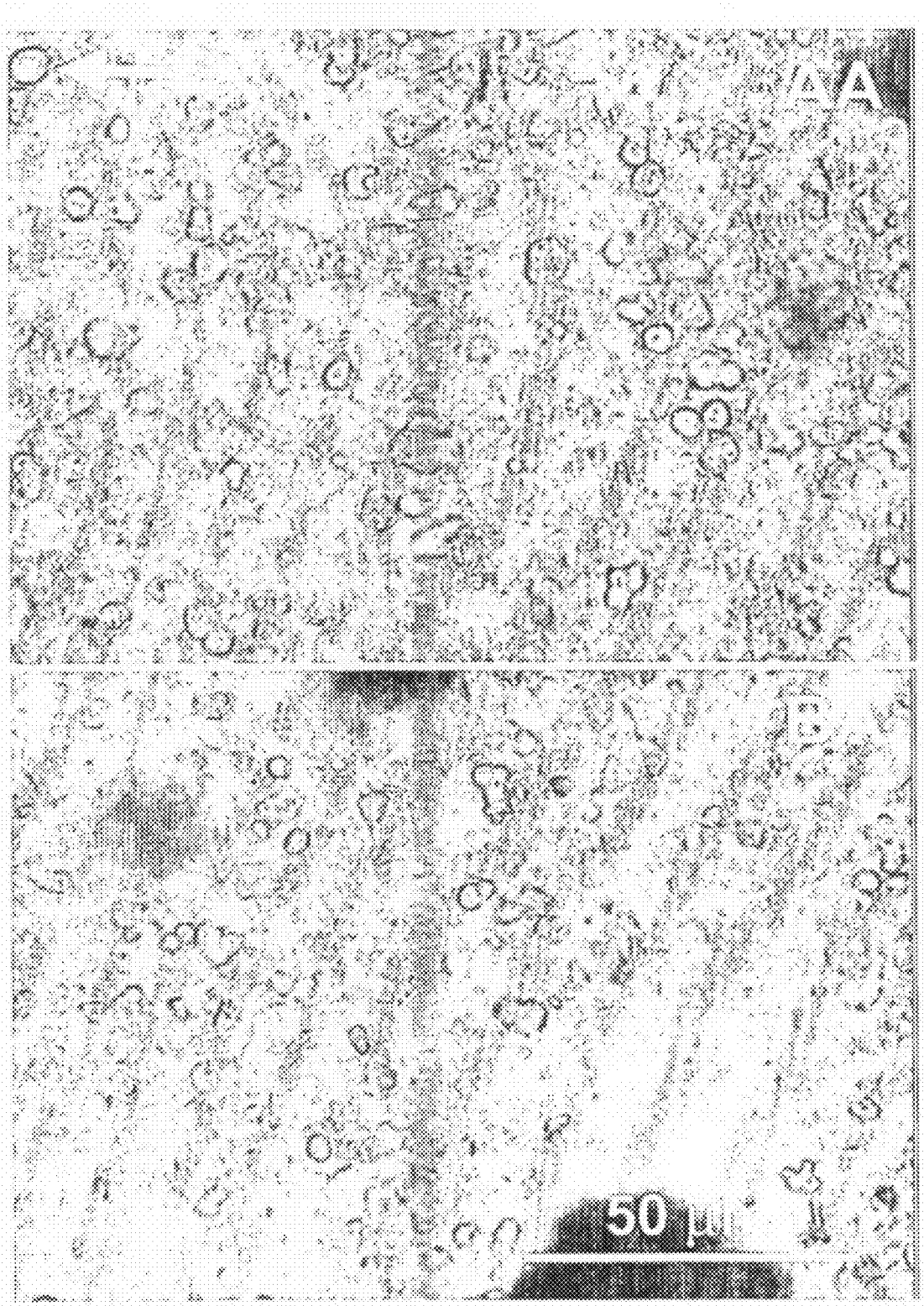
FIGS. 1a to 1c show bright field microscopic pictures of starch changes in alkalized deacylated cocoa liquor and alkalized non-deacylated cocoa liquor.

It has been found that a cocoa product having improved wettability factors and functionality comprises benefits related to starch changes due to reduced content of phospholipids. Such starch modifications are due by enhanced starch swelling, enhanced amylose leaching from the matrix in starch granules and the formation of complexes between amylose and appropriate lipids.

The term "appropriate lipids" means lipid classes that are known to form complexes with amylose and at the same time, that are available in the matrix to interact with leached amylose. In the cocoa product of the invention, free fatty acids account for the most available, lysophospholipids (lyso-PC in particular) for the most active or preferable, and traces of monoacylglycerols and diacylglycerols for useful lipid classes.

In addition, "appropriate lipids" are obtainable from exogenous sources. For instance, lecithins and lyso-lecithins and a range of emulsifiers and synthetic lipids are known to interact with amylose. Such lipids are miscible with moisturized modified cocoa liquor after amylose leaching.

In particular, the formation of amylose-lipid complexes involves minimizing starch retrogradation in cocoa. Such complexes form in situ and delay retrogradation of the native starch.

The cocoa product of the present invention has a reduced content of phospholipids such endogenous phospholipids. It has been shown in practice, that the content of phospholipids in the cocoa product of the present invention should be reduced by at least 50%. A preferred range lies between 60 and 90%.

As shown above, the improved wettability characteristics of the cocoa product of the invention are associated with a reduced amount of phospholipids naturally contained in the cocoa product. The phospholipids contained comprise phosphatidylcholine, phosphatidylinositol, phosphatidylethanolamine, phosphatidic acid and the lysophospholipids derived therefrom.

The data in the following table 1 show the major differences in the molar phospholipid composition of standard cocoa and cocoa variants according to the present invention. The cocoa product of the present invention shows a molar ratio of phosphatidylcholine to lyso-phosphatidylcholine which is remarkably different from that of standard cocoa products. In particular, the molar ratio of phosphatidylcholine (PC) to lyso-PC (LPC) is in a range of 3:1 to 1:3 in the cocoa product of the present invention. This is in contrast to standard cocoa, wherein the molar ratio of phosphatidylcholine (PC) to lyso-PC (LPC) is higher than 3:1, in some cases at least 5:1.

In a preferred embodiment of the present invention, the molar ratio of phosphatidylcholine (PC) to lyso-phosphatidylcholine (LPC) is reduced to 1:1.

The hexane-defatted cocoa solids used are useful for authentication of modified and non-modified cocoa variants. Hexane-based defatting removes most free lipids such as acylglycerols, from the cocoa matrix. In addition, defatting removes soybean lecithin, which is added to powdered beverages for instantizing purposes.

TABLE 1

Phospholipids in hexane-defatted cocoa solids before and after modification

| Phospholipids [mmol/kg] | Hexane-defatted cocoa solids [a] | | | | |
|---|---|---|---|---|---|
| | Standard | Variant 1 | Variant 2 | Variant 3 | Variant 4 |
| Lyso-PC (LPC) [MW 515] | 0.62 | 0.76 | 0.54 | 0.58 | 0.68 |
| Phosphatidyl-choline (PC) [MW 770] | 3.12 | 0.91 | 0.68 | 0.62 | 0.65 |
| Phosphatidyl-inositol (PI) [MW 835] | 1.54 | 0.51 | 0.39 | 0.40 | 0.38 |
| Phosphatidyl-ethanolamine (PE) [MW 725] | 0.43 | 0.22 | 0.16 | 0.17 | 0.18 |
| Phosphatidic acid (PA) [MW 685] | 1.33 | 0.61 | 0.48 | 0.38 | 0.39 |
| Sum [mmol/kg] | 7.04 | 3.01 | 2.25 | 2.15 | 2.28 |
| PC:LPC Ratio | 5.0 | 1.2 | 1.3 | 1.1 | 1.0 |

[a] Standard, original cocoa liquor; Variants 1 to 4 are phospholipid reduced, modified cocoa liquor.

According to the invention, the content of endogenous phosphatidylcholine can be less than 1 mmol/kg, preferably less than 0.5 mmol/kg, most preferred 0.25 mmol/kg in hexane-defatted cocoa liquor.

According to a preferred embodiment of the invention, the cocoa product is a cocoa liquor. In another preferred embodiment of the invention, the cocoa product is a cocoa powder obtained from the cocoa liquor according to techniques well known in the art, such as grinding, pressing, etc.

As already mentioned beforehand, alkalization of cocoa liquor is consistent with obtaining desirable color and flavour attributes. It has been further shown in the present invention that an alkalized cocoa product also contributes to wettability improvement. A particularly preferred cocoa product is a cocoa powder having a highly reduced phospholipid content and being alkalized.

The composition of the present invention contains a cocoa product as described above. The cocoa product is preferably a cocoa powder which is alkalized and having a highly reduced phospholipid content.

The composition of the invention may contain further ingredients such as sugar, soybean lecithin, salts, vitamins, minerals and flavours. In a particularly preferred embodiment, the composition is instantized to be readily dissolvable in a suitable medium such as an aqueous medium.

The beverage of the present invention is a drink containing the above instantized composition. In a preferred embodiment the beverage further comprises milk in which the composition is present in a dissolved state.

According to the invention, the cocoa product of the invention provides improved wettability factors in powdered beverages. In particular, alkalized cocoa liquor reduced in phospholipid content remarkably improves wettability in instant cocoa beverage powders during prolonged storage comprising defined exposure to ambient moisture.

The process of the present invention provides a cocoa product having specified wettability and authentication attributes in powdered instant compositions during long-term storage.

The process of the invention comprises the step of reducing the endogenous phospholipid content of the cocoa product. Other phospholipids, f.e. in emulsifiers such as lecithin, may be present in addition.

The process of reducing the phospholipid content of the cocoa product encompasses any process with which the phospholipid level in commercial cocoa liquor variants can be decreased and standardized and with which the phospholipid classes can be derivatized to obtain inactive analogues. Examples of such a process consist in enzymatical and chemical methods.

Reduction of the phospholipid content can be made by hydrolysis of the phospholipids, i.e., glycero-phospholipids using an appropriate deacylation treatment.

In a preferred embodiment of the present invention the phospholipid content is reduced by enzymatic deacylation of the phospholipids.

In essence, any enzyme can be used capable of removing the O-acyl fatty acid moieties from most species in the phospholipids. Preferably, a phospholipase is used. An appropriate enzyme can be any commercial phospholipase such as a genetically engineered lipase, fox example carboxylic ester hydrolase used at functional conditions.

The process of the present invention preferably further comprises the step of alkalizing the phospholipid reduced cocoa product. Alkalizing can be carried out according to known techniques. For example, the phospholipid reduced cocoa product may be treated with a potash solution at increased temperature.

After alkalization the alkalized phospholipid reduced cocoa product can be dried to obtain an alkalized phospholipid reduced liquor. Subsequent grinding and pressing the cocoa liquor results in a phospholipid reduced cocoa powder. The cocoa powder produced according to the process of the present invention exhibits defined starch properties and wettability effects in instantized cocoa powder beverage products.

A process of producing a cocoa liquor having a reduced phospholipid content comprises the following steps:
  providing a cocoa liquor;
  subject ing the moisturized cocoa liquor to a deacylation treatment;
  alkalizing the cocoa liquor with an alkalization agent and drying the alkalized cocoa liquor.

There are no specific limitations as to the use of the cocoa liquor to be treated according to the process of the present invention. An example of a suitable cocoa liquor is a raw cocoa liquor obtainable from commercial sources in which the original pH value is close to 5.5.

Before carrying out the deacylation treatment, the cocoa liquor may be moisturized for example by adding 0-20% water.

The deacylation treatment can be carried out in usual manner including an enzyme or chemical treatment. Preferably, the deacylation treatment is carried out in the presence of an enzyme.

The enzyme to be used in the deacylation treatment can be any enzyme suitable for cleaving the glycero-phospholipids. A suitable enzyme is a carboxylic ester hydrolase, for example genetical phospholipase $A_1$ such as Lecitase Ultras® (Novozymes A/S, DK).

In principle, Ultra® which is an aqueous preparation containing microbial carboxylic ester hydrolase, is described by the manufacturer to modify egg yolk and degum vegetable oils by hydrolyzing glycero-phospholipids to lyso-derivatives and free fatty acids. The claimed enzymatic activity proceeds between 50 to 55° C. at pH 4.5 to 6.0.

The enzyme is preferably used in an amount of 10 to 500 mg in 100 g moisturized cocoa liquor, with a particularly preferred range of 100 to 250 mg.

According to the invention, however, the above behavior of Ultra® was modified in the cocoa liquor moisturized with 0.1 to 10%, preferably 2 to 7%, and even more preferably 3.5 to 5.5% water. Consequently, most species in the glycero-phospholipid classes hydrolyzed to free fatty acids and non-lipid residues.

After incubation with the phospholipase the enzyme is thermally inactivated according to the manufacturer's instructions. In case of Ultra® the inactivation occurs at temperatures above 65° C.

The subsequent alkalization of the reduced phospholipid cocoa liquor is carried out with an alkalization agent such as potassium carbonate (potash). Generally, the phospholipid reduced cocoa liquor is completed with a potash solution at a temperature ranging from 80 to 130° C.

A typical classical alkalization of liquor is as follows: A known amount of phospholipase treated cocoa liquor is brought to 82° C. using a Winkworth® jacketed cell fitted with two blade rotors and kept at the same temperature, followed by adding an appropriate amount of an alkalization solution, which usually contains 47 parts of $K_2CO_3$ and 53 parts of water by weight.

The temperature is brought to 125° C. to evaporate excess moisture from the liquor, after which the mixing blades and heating are turned off. The liquor dried to less than 2% residual moisture, preferably to at least 1.5% residual moisture, is cooled to ambient temperature and may then be used for common processing steps such as pressing, which are well known in the field of cocoa industry.

It has been shown that in some instances, e.g. after elimination of most phospholipids, a partial enzymatic hydrolysis of starch can be additionally carried out in the process of the invention. For this purpose, an amylase is commonly used. An example for a suitable amylase is fungal α-amylase.

Drying of the phospholipid reduced, alkalized cocoa liquor can be performed in vacuum or non-vacuum cookers. Vacuum drying usually proceeds at temperatures less than 100° C. while non-vacuum cookers need temperatures of up to 130° C.

In order to obtain a cocoa powder the dried, alkalized cocoa liquor is additionally milled, if needed, and pressed according to common techniques.

If desired, the cocoa product is defatted by means of methods known in the art. One example of defatting is an extraction using apolar hydrocarbon solvents such as hexane.

The cocoa product of the present invention as well as the cocoa products obtained by the process of the present invention have been shown to maximize starch swelling and minimize retrogradation of starch. Further, the combination of reducing phospholipid content and subsequent alkalization results in improving the cocoa starch behaviour such as free fat scavenging by amylose-leached starch "ghosts" and minimizing retrogradation that maintains starch hydrophilic.

Remarkably, cocoa starch granules and the parent cocoa matrix are subject to irreversible and relevant changes due to enzymatic deacylation of most phospholipids at 50° C. and subsequent exposure to water at increased temperatures.

Figure 1B:
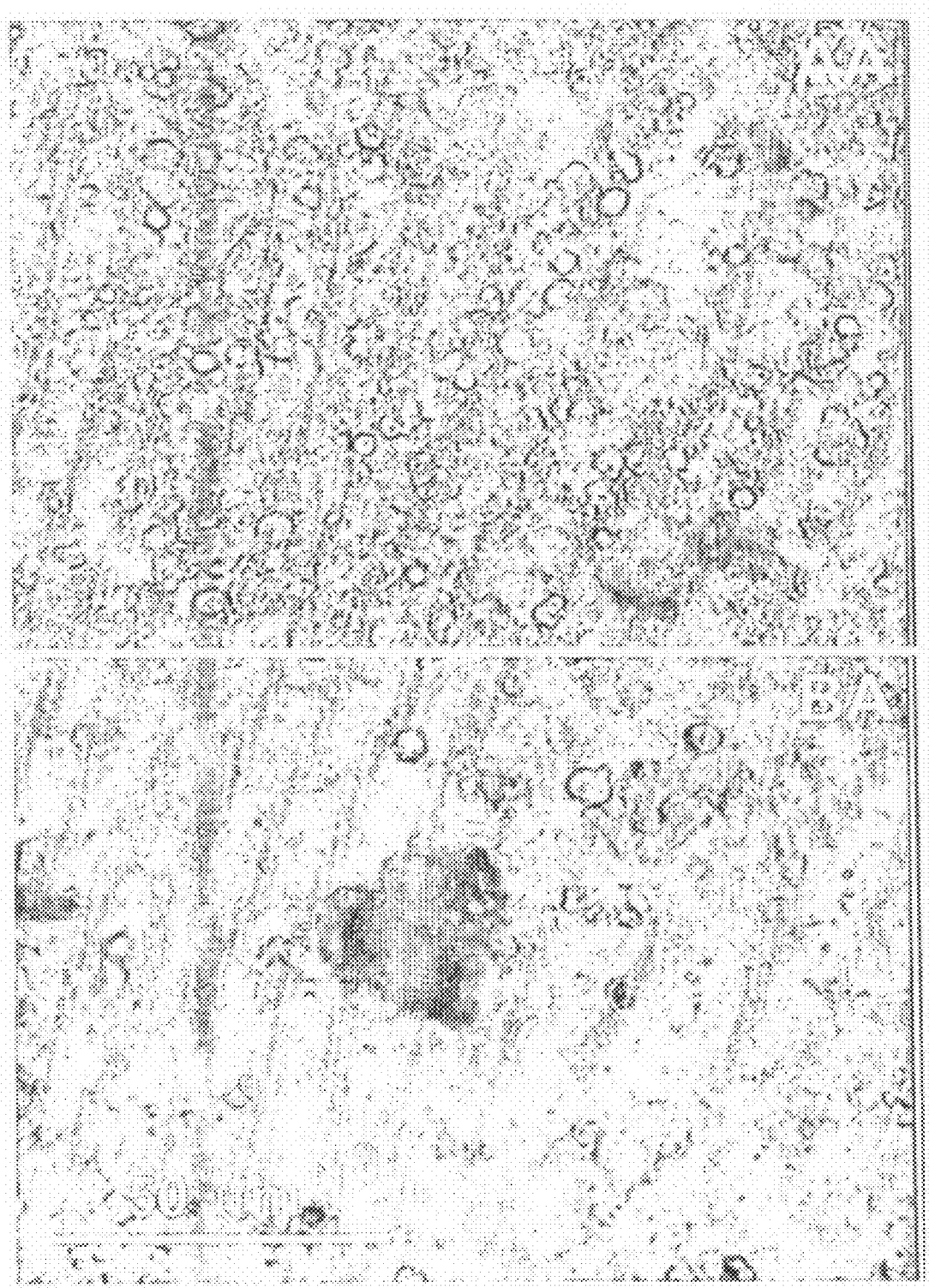
Figure 1C:
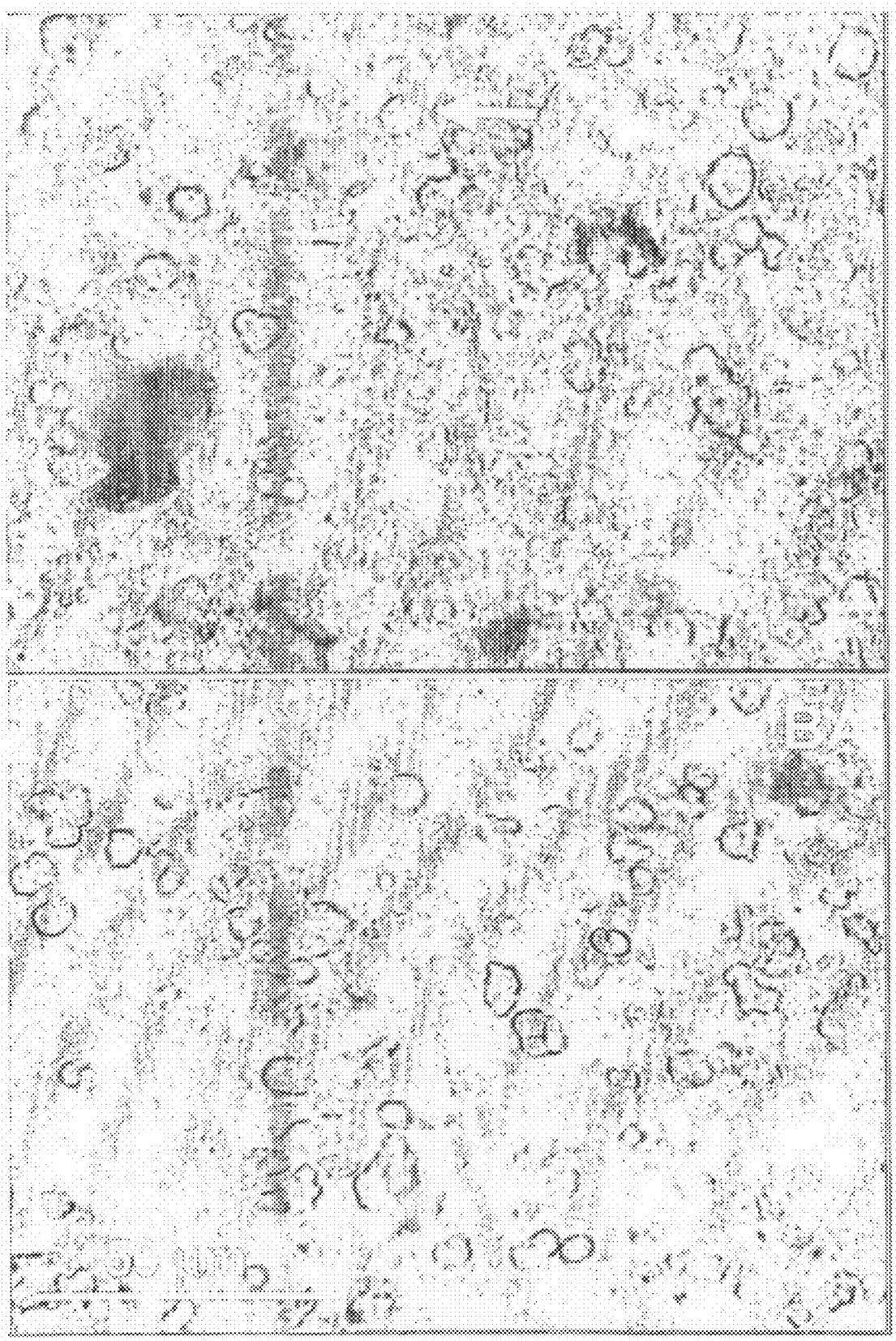

The final consequences of starch changes in deacylated cocoa liquor after alkalization at 125° C. are further visualized and authenticated in FIGS. 1-a to 1-c. In particular, bright field microscopy after re-hydration at room temperature shows typical cocoa starch granules as readily discernible spheroid units in non-deacylated and alkalized liquor variant "AA" (white arrows). These units are much less discernible in deacylated "BA" for one major reason: the original starch granules collapsed to polymorphic "ghosts" due to previous amylose leaching and elimination of excess water by drying. These amylose-leached "ghosts" are expected to scavenge migrating fat in the cocoa matrix.

Figure 2:
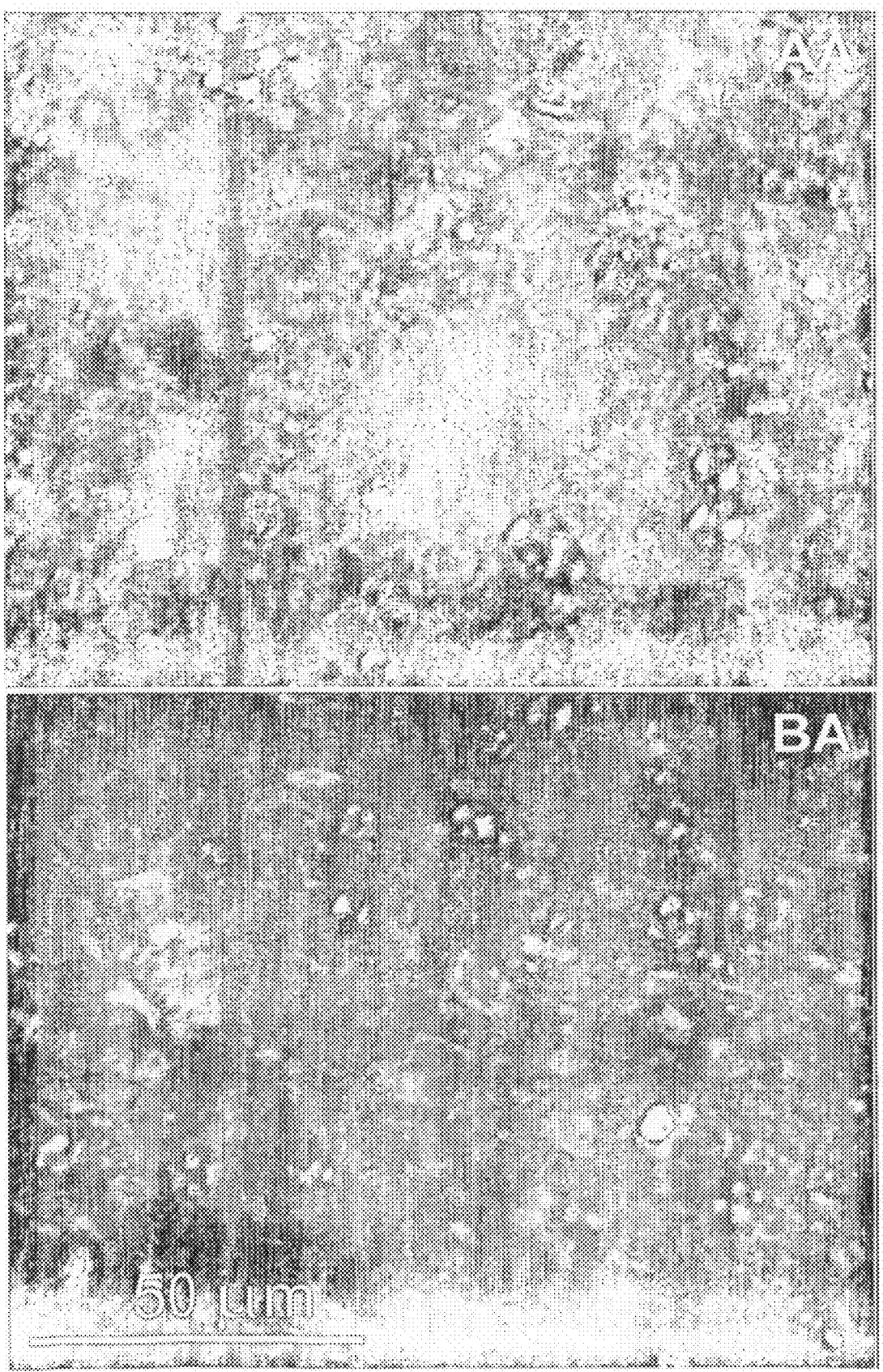
FIG. 2 shows a polarisation light microscopic picture in the matrix of alkalized, deacylated and non-deacylated cocoa liquor.

Remarkably, polarization light microscopy shows a major loss of birefringence in the matrix of deacylated and alkalized cocoa variant "BA" compared to non-deacylated standard "AA" in FIG. 2. The loss of birefringence and hence, the lost capacity to refract light are attributed to perturbed crystallinity in starch granules due to irreversible changes such as starch gelatinization followed by swelling in variant "BA".

The following examples are to illustrate the invention and are not intended to limit its scope in any manner.

EXAMPLE 1

Phospholipolysis of Cocoa Liquor

A twin-blade mixer (Winkworth®) fitted with a jacketed cell was used for cocoa liquor processing. Exactly 300 g of cocoa liquor were weighed into the cell kept at 49.5±0.5° C. and liquefied. The melted liquor was moisturized with 12.4 g water, followed by adding 500 mg Ultra® and tightly sealing the cell to avoid moisture loss. The enzymatic process proceeded for 60 min at 50° C. and 95 rpm. After phospholipolysis, the cell was unsealed and the enzyme inactivated by keeping the liquor for 30 min at 82° C. and 95 rpm. The subsequent alkalization step consisted in dissolving 47 parts of potassium carbonate in 53 parts of water by weight, followed by adding 9 g of this solution into the liquor at 82° C. and 95 rpm. Finally, the operating temperature was brought to 125° C. and the liquor dried for 60 min at 95 rpm in the unsealed cell. In addition, the above process was repeated in the absence of Ultra® to obtain a control sample using another 300 g portion of fresh cocoa liquor.

EXAMPLE 2

Hexane-Based Defatting of Processed Cocoa Liquor

Processed cocoa liquor and control (Ex. 1) were defatted at 50° C. to decrease the level of neutral lipids for improved recoveries of endogenous PL from the cocoa matrix and its microscopic evaluation. The following defatting procedure was applied: One volume (e.g. 50 g) of cocoa liquor is brought to 50° C., weighed into a 250 mL glass beaker pre-heated to 50° C. and completed with two volumes of hexane (i.e. about 100 mL) that was previously brought to 50° C. The resulting suspension is stirred for one min at 50° C. using a spatula. The suspension is passed through a No. 602 filter paper sheet that is kept in an appropriate Büchner type of Pyrex®-glass filter-holder pre-heated to 50° C. The Büchner filtration procedure is assisted using a vacuum water pump. The resulting filter cake is re-suspended in two volumes of hexane as above, after which the filtration procedure is repeated to obtain desolvantized and defatted cocoa solids. Such solids typically retain 2 to 7% residual fat and endogenous PL.

EXAMPLE 3

Extraction of Total Lipids (TL)

TL were extracted using the method of Folch et al [A simple method for the isolation and purification of total lipids from animal tissues, 1957, J Biol Chem 226: 497-509]. In principle, 10 g defatted cocoa liquor was suspended in two volumes of water and extracted using 19 volumes chloroform-MeOH 2:1 (v/v).

The extract was Büchner-filtered and partitioned against 0.2 volumes 0.88% KCl. Lipids in the lower-phase were concentrated to dryness and weighed.

EXAMPLE 4

Analysis of Phospholipids (PL)

Individual total lipid extracts (250 µg) were deposited on 10×20 cm HPTLC silica gel plates Merck #1.05642 previously impregnated with 2% boric acid in ethanol. Neutral lipids were removed from the spotted lipids by one fold elution using hexane-diethylether 60:40 (v/v) as mobile phase. The chromatogram was dried with a stream of nitrogen, followed by HPTLC separation of PL into their individual classes using chloroform-EtOH-MeOH-triethylamine-water 30:25:10:35:8 (v/v) as the mobile phase. The plate was dried for 5 min at 180° C., cooled to room temperature and reacted with a molybdate dip-in reagent for 30 min. The lipid-bound phosphorus visualized as polymorphic blue-tinted spots at 20° C. and relative humidity >50%. The chromogenic response of PL spots was measured at $\lambda=595$ nm using a Desaga CD-60 Densitometer. Nanomolar concentrations of individual PL classes were calculated using the peak area units and standard calibration curves for phosphatidylcholine (PC), lyso-PC (LPC), phosphatidylinositol (PI), phosphatidylethanolamine (PE) and phosphatidic acid (PA) of soybean origin.

Samples of the alkalized deacylated cocoa liquor were used for microscopy analysis.

The invention claimed is:

1. A cocoa product that is alkalized and in which endogenous phospholipids contained therein have been deacylated such that the cocoa product comprises a reduced content of endogenous phospholipids as compared to a standard cocoa product that does not have a reduced content of endogenous phospholipids, the cocoa product further having improved wettability in powdered beverages as compared to the standard cocoa product.

2. The cocoa product according to claim 1, wherein the content of endogenous phospholipids is reduced by at least 50%.

3. The cocoa product according to claim 1, wherein the content of phospholipids is reduced by 60 to 90%.

4. The cocoa product according to claim 1, wherein the endogenous phospholipids are selected from the group consisting of phosphatidylcholine, phosphatidylinositol, phosphatidylethanolamine, phosphatidic acid and lysophospholipids derived therefrom.

5. The cocoa product according to claim 1, wherein the molar ratio of phosphatidylcholine to lyso-phosphatidylcholine is approximately 1:1.

6. The cocoa product according to claim 1, wherein the product is in a cocoa form selected from the group consisting of liquor and cocoa powder.

7. A cocoa product that is alkalized and in which endogenous phospholipids contained therein have been deacylated such that the cocoa product has a molar ratio of phosphatidylcholine to lyso-phosphatidylcholine from 3:1 to 1:3.

8. A composition containing a cocoa product that is alkalized and in which endogenous phospholipids contained therein have been deacylated such that the cocoa product comprises a reduced content of endogenous phospholipids as compared to a standard cocoa product that does not have a reduced content of endogenous phospholipids, the cocoa product further having improved wettability in powdered beverages as compared to the standard cocoa product.

9. The composition according to claim 8, which is instantized.

10. A beverage containing a composition that is alkalized and in which endogenous phospholipids contained therein have been deacylated such that the composition comprises a reduced content of endogenous phospholipids as compared to a standard cocoa product that does not have a reduced content of endogenous phospholipids, the composition further having improved wettability in powdered beverages as compared to the standard cocoa product.

11. The beverage according to claim 10 further comprising milk.

12. A process of producing a cocoa product, the process comprising:
reducing the phospholipid content of the cocoa product by a step selected from the group consisting of enzymatic deacylation, chemical deacylation, and combinations thereof that deacylates endogenous phospholipids contained in the cocoa product; and
alkalizing the cocoa product with an alkalization agent.

13. The process according to claim 12, wherein the phospholipid content is reduced by enzymatic hydrolysis of the phospholipids.

14. The process according to claim 13, wherein a carboxylic ester hydrolase such as a phospholipase is used.

15. A process of producing a cocoa liquor having a reduced phospholipid content, the process comprising:
providing a cocoa liquor;
subjecting a moisturized cocoa liquor to a deacylation treatment to deacylate endogenous phospholipids contained in the moisturized cocoa liquor;
alkalizing the cocoa liquor with an alkalization agent; and
drying the alkalized cocoa liquor.

16. The process according to claim 15, wherein the deacylation treatment is carried out enzymatically.

17. The process according to claim 16, wherein a phospholipase is used.

18. The process according to claim 17, wherein the cocoa liquor is moisturized with 0.1 to 12% water.

19. The process according to claim 16, wherein the enzyme is thermally inactivated after the deacylation treatment.

20. The process according to claim 15, wherein potassium carbonate is used as an alkalization agent.

21. The process according to claim 20, wherein the alkalization is carried out at a temperature ranging from 80 to 130° C.

22. The process according to claim 15, wherein the alkalized cocoa liquor is dried in cookers.

23. The process according to claim 15, wherein the dried, alkalized cocoa liquor is ground and pressed to obtain cocoa powder.

24. The process according to claim 15, wherein the cocoa product is defatted.

25. A cocoa product that is alkalized and in which endogenous phospholipids contained therein have been deacylated such that the cocoa product has a content of endogenous phosphatidylcholine of less than 1.0 mmol/kg.

26. A process of producing a cocoa product, the process comprising:
reducing the phospholipid content of the cocoa product by deacylating endogenous phospholipids contained in the cocoa product;
alkalizing the phospholipid-reduced cocoa product; and
drying the alkalized, phospholipid-reduced cocoa product to obtain an alkalized, phospholipid-reduced cocoa liquor.

* * * * *